United States Patent
Kusano et al.

(10) Patent No.: US 6,705,682 B2
(45) Date of Patent: Mar. 16, 2004

(54) HYDRAULIC BRAKE APPARATUS FOR A VEHICLE

(75) Inventors: Akihito Kusano, Toyota (JP); Satoshi Ishida, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/244,756

(22) Filed: Sep. 17, 2002

(65) Prior Publication Data

US 2003/0071518 A1 Apr. 17, 2003

(30) Foreign Application Priority Data

Sep. 17, 2001 (JP) ........................................ 2001-281203

(51) Int. Cl.$^7$ ................................. B60T 8/44
(52) U.S. Cl. ................................. 303/114.1; 303/113.3; 60/593; 60/581; 60/552
(58) Field of Search ........................... 303/113.3, 114.1, 303/114.2, 115.1, 115.5, 114.3, 113.4, 115.4, 115.2; 60/552, 581, 591, 593

(56) References Cited

U.S. PATENT DOCUMENTS

| | | | | |
|---|---|---|---|---|
| 4,416,491 A | * | 11/1983 | Belart et al. ............. | 303/114.1 |
| 4,703,978 A | * | 11/1987 | Belart et al. ............. | 303/52 |
| 4,750,789 A | * | 6/1988 | Belart et al. ............. | 303/114.1 |
| 4,807,942 A | * | 2/1989 | Belart ..................... | 303/114.1 |
| 4,867,509 A | * | 9/1989 | Maehara et al. ......... | 303/122.01 |
| 4,891,945 A | * | 1/1990 | Becker .................... | 60/547.1 |
| 5,878,573 A | * | 3/1999 | Kobayashi et al. ....... | 60/547.1 |
| 5,890,363 A | * | 4/1999 | Kobayashi et al. ....... | 60/560 |
| 6,196,641 B1 | * | 3/2001 | Oka et al. ............... | 303/114.1 |
| 6,352,316 B1 | * | 3/2002 | Oka et al. ............... | 303/114.3 |
| 6,513,884 B2 | * | 2/2003 | Nishii et al. ............. | 303/114.1 |
| 6,564,553 B2 | * | 5/2003 | Oka et al. ............... | 60/550 |

FOREIGN PATENT DOCUMENTS

JP 3-45456 2/1991

\* cited by examiner

Primary Examiner—Christopher P. Schwartz
Assistant Examiner—Devon Kramer
(74) Attorney, Agent, or Firm—Burns, Doane, Swecker & Mathis, LLP

(57) ABSTRACT

A vehicle hydraulic brake apparatus includes a hydraulic pressure generator which generates a power pressure irrespective of operation of a brake pedal and a regulation valve which regulates the power pressure to a predetermined pressure corresponding to an operation force of the brake pedal and outputs it to an output chamber. A master cylinder generates a master cylinder pressure in a master cylinder chamber by forward movement of the master cylinder piston and a wheel brake cylinder is operated by the master cylinder pressure to apply braking force to a vehicle wheel. An auxiliary piston is located backward the master cylinder piston to define an auxiliary pressure chamber between the master cylinder piston and the auxiliary piston and to move the master cylinder piston forward by an auxiliary pressure in the auxiliary pressure chamber. A pressure modulating device decreases the predetermined pressure outputted from the output chamber to supply the auxiliary pressure to the auxiliary pressure chamber. A pressure chamber communicates with the output chamber of the regulation valve to bias the auxiliary piston backward by a pressure in the pressure chamber. The auxiliary piston is biased backward by both the auxiliary pressure in the auxiliary pressure chamber and the pressure in the pressure chamber when both of the hydraulic pressure generator and the regulation valve are a normal condition in which the predetermined pressure can be outputted to the output chamber of the regulation valve, and the auxiliary piston is moved forward by the operation force of the brake pedal to move the master cylinder piston forward when at least one of the hydraulic pressure generator and the regulation valve is an abnormal condition in which the predetermined pressure cannot be outputted to the output chamber of the regulation valve.

10 Claims, 2 Drawing Sheets

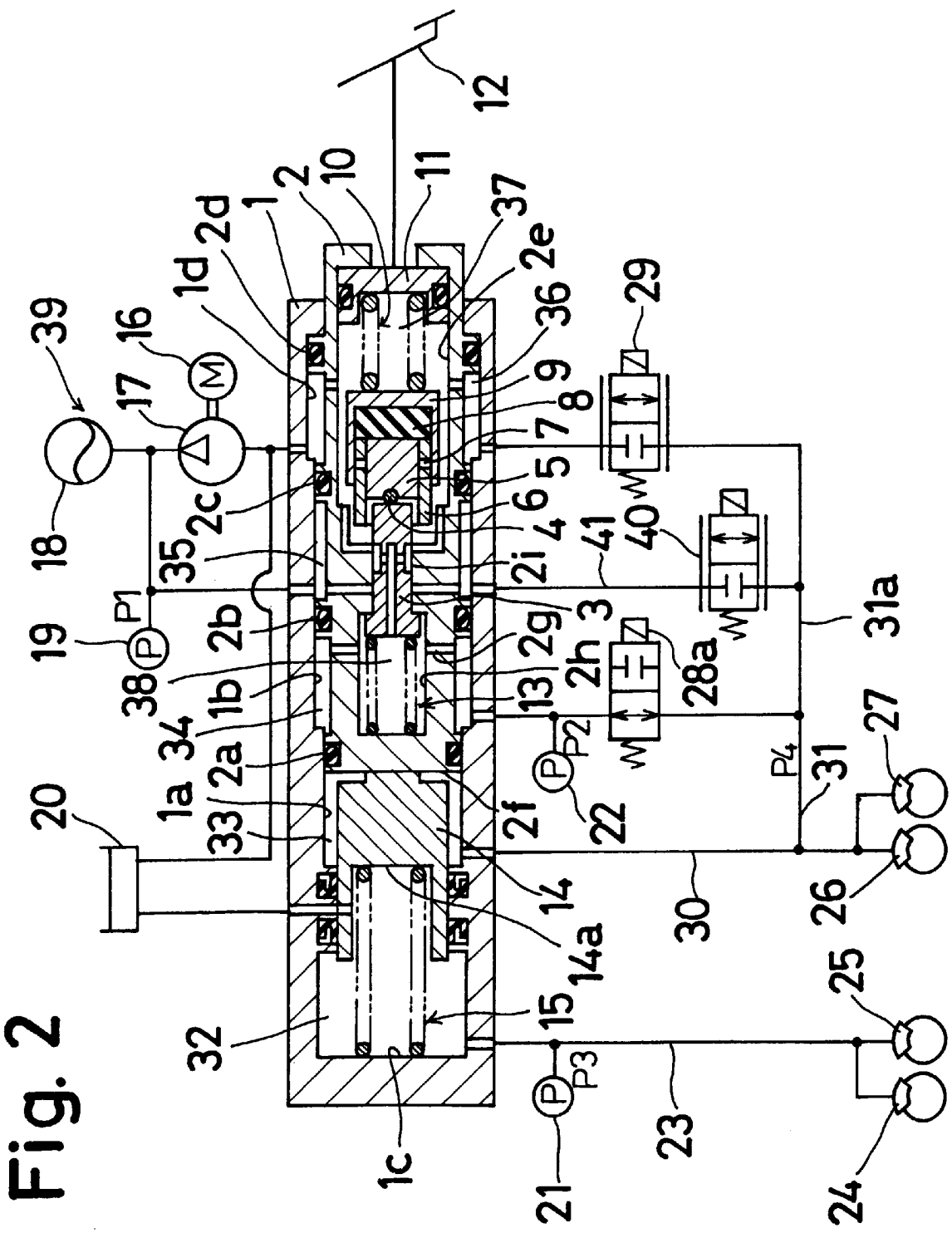

HYDRAULIC BRAKE APPARATUS FOR A VEHICLE

CROSS REFERENCE TO RELATED APPLICATIONS

This application is based on and claims priority under 35 U.S.C. §119 with respect to Japanese Patent Application 2001-281203, filed on Sep. 17, 2002, the entire content of which is incorporated herein by reference.

FIELD OF THE INVENTION

This invention relates to a hydraulic brake apparatus for a vehicle. Particularly, this invention pertains to a hydraulic brake apparatus suitable for an electric vehicle to perform regenerative braking.

BACKGROUND OF THE INVENTION

A known hydraulic brake apparatus for a vehicle is disclosed in Japanese laid-open publication No 3(1991)-45456 published on Feb. 27, 1991. This hydraulic brake apparatus includes a hydraulic pressure generator for generating a power pressure irrespective of operation of a brake pedal and outputs the power pressure. A regulation valve regulates the power pressure outputted from the hydraulic pressure generator to a predetermined pressure corresponding to an operation force of the brake pedal and outputs the predetermined pressure to an output chamber. A master cylinder has a master cylinder piston and a master cylinder pressure chamber located forward the master cylinder piston to generate a master cylinder pressure by forward movement of the master cylinder piston. A wheel brake cylinder is operated by the master cylinder pressure to apply braking force to a wheel of the vehicle. An auxiliary piston is located backward the master cylinder piston to define an auxiliary pressure chamber between the master cylinder piston and the auxiliary piston. The auxiliary pressure chamber communicates with the output chamber of the regulation valve to move the master cylinder forward. When both of the hydraulic pressure generator and the regulation valve are normal condition in which the predetermined pressure can be outputted to the output chamber of the regulation valve, the auxiliary piston is biased backward by the auxiliary pressure in the auxiliary pressure chamber and kept in the initial position. In this hydraulic brake apparatus, in the normal condition, the operation (depression) force of the brake pedal which is necessary for applying a certain braking force to the wheel is relative small.

On the other hand, when at least one of the hydraulic pressure generator and the regulation valve is abnormal condition in which the predetermined pressure cannot be outputted to the output chamber of the regulation valve, the auxiliary piston is moved forward from the initial position by the operation force of the brake pedal to move the master cylinder piston forward. In detail, in this abnormal condition, the auxiliary pressure is not generated in the auxiliary pressure chamber and thus the auxiliary piston is not biased backward by the auxiliary pressure. If the brake pedal is operated, the auxiliary piston is moved forward by the braking operation force and contact to the master cylinder piston to move master cylinder piston forward. As a result, the braking pressure can be supplied to the wheel brake cylinder.

An electric vehicle driven by an electric motor is known. In this electric vehicle, both regenerative braking force generated by the motor and hydraulic braking force generated by the hydraulic pressure in the wheel brake cylinder are cooperatively applied to the wheel to increase the life of a battery which is an electric source of the motor (regenerative cooperation brake). In the electric vehicle, when the brake pedal is operated, the regenerative braking force must be taken priority over the hydraulic braking force for recovering the wasteful energy. Thus, it is necessary to decrease the hydraulic pressure supplied to the wheel cylinder by a hydraulic pressure corresponding to regenerative braking force in order to generate an appropriate braking force corresponding to the operation force of the brake pedal or braking force required by a driver.

However, in the above known hydraulic brake apparatus, because the auxiliary pressure chamber communicates with the output chamber of the regulation valve, the auxiliary pressure in the auxiliary pressure chamber is equal to the pressure in the output chamber corresponding to the braking operation force. For that reason, the master cylinder pressure corresponding to the braking operation force is supplied to the wheel cylinder. Thus, if the known apparatus is applied to the electric vehicle performing the above regenerative cooperation brake, a braking force greater than that required by the driver is applied to the wheel by the regenerative braking force. Thus, it is necessary to add a pressure modulation device which decreases the predetermined pressure outputted from the output chamber of the regulation valve by the hydraulic pressure corresponding to the regenerative braking force for supplying the decreased pressure to the auxiliary pressure chamber in order to solve the drawback of the known hydraulic brake apparatus.

However, if a larger regenerate braking force is required in dependence on a vehicle condition such as a vehicle speed, the pressure supplied to the auxiliary pressure chamber by the pressure modulation device becomes lower and thus biasing force for biasing the auxiliary piston backward by the pressure in the auxiliary pressure chamber becomes smaller. In this condition, even if both of the hydraulic pressure generator and the regulation valve are the normal condition in which the predetermined pressure can be outputted to the output chamber of the regulation valve, the auxiliary piston may be moved forward unnecessarily by the braking operation force and thus the master cylinder piston may be moved forward unnecessarily. As a result, a superfluous master cylinder pressure and superfluous hydraulic braking force may be generated.

A need exists for a vehicle hydraulic brake apparatus which is not susceptible to the drawbacks mentioned above.

SUMMARY OF THE INVENTION

A hydraulic brake apparatus for a vehicle includes a hydraulic pressure generator which generates a power pressure irrespective of operation of a brake pedal and outputs the power pressure and a regulation valve which regulates the power pressure outputted from the hydraulic pressure generator to a predetermined pressure corresponding to an operation force of the brake pedal and outputs the predetermined pressure to an output chamber. A master cylinder has a master cylinder piston and a master cylinder pressure chamber located forward the master cylinder piston to generate a master cylinder pressure by forward movement of the master cylinder piston. A wheel brake cylinder is operated by the master cylinder pressure to apply braking force to a wheel of the vehicle. An auxiliary piston is located backward the master cylinder piston to define an auxiliary pressure chamber between the master cylinder piston and the auxiliary piston and to move the master cylinder forward by an auxiliary pressure in the auxiliary pressure chamber. A pressure modulating device modulates the auxiliary pressure in the auxiliary pressure chamber to a pressure less than the predetermined pressure in the output chamber of the regulation valve. A pressure chamber communicates with the output chamber of the regulation valve to bias the auxiliary piston backward by a pressure in the pressure chamber. The auxiliary piston is biased backward by both the auxiliary pressure in the auxiliary pressure chamber and the pressure in the pressure chamber when both of the hydraulic pressure generator and the regulation valve are a normal condition in which the predetermined pressure can be outputted to the output chamber of the regulation valve, and the auxiliary piston is moved forward by the operation force of the brake pedal to move the master cylinder piston forward when at least one of the hydraulic pressure generator and the regulation valve is an abnormal condition in which the predetermined pressure cannot be outputted to the output chamber of the regulation valve.

BRIEF DESCRIPTION OF THE DRAWING FIGURES

The foregoing and additional features and characteristics of the present invention will become more apparent from the following detailed description considered with reference to the accompanying drawing figures, in which like reference numerals designate like elements.

FIG. 2 is a schematic illustration of a hydraulic brake apparatus for a vehicle according to another embodiment of the present invention.

DETAILED DESCRIPTION OF THE INVENTION

Figure 1:
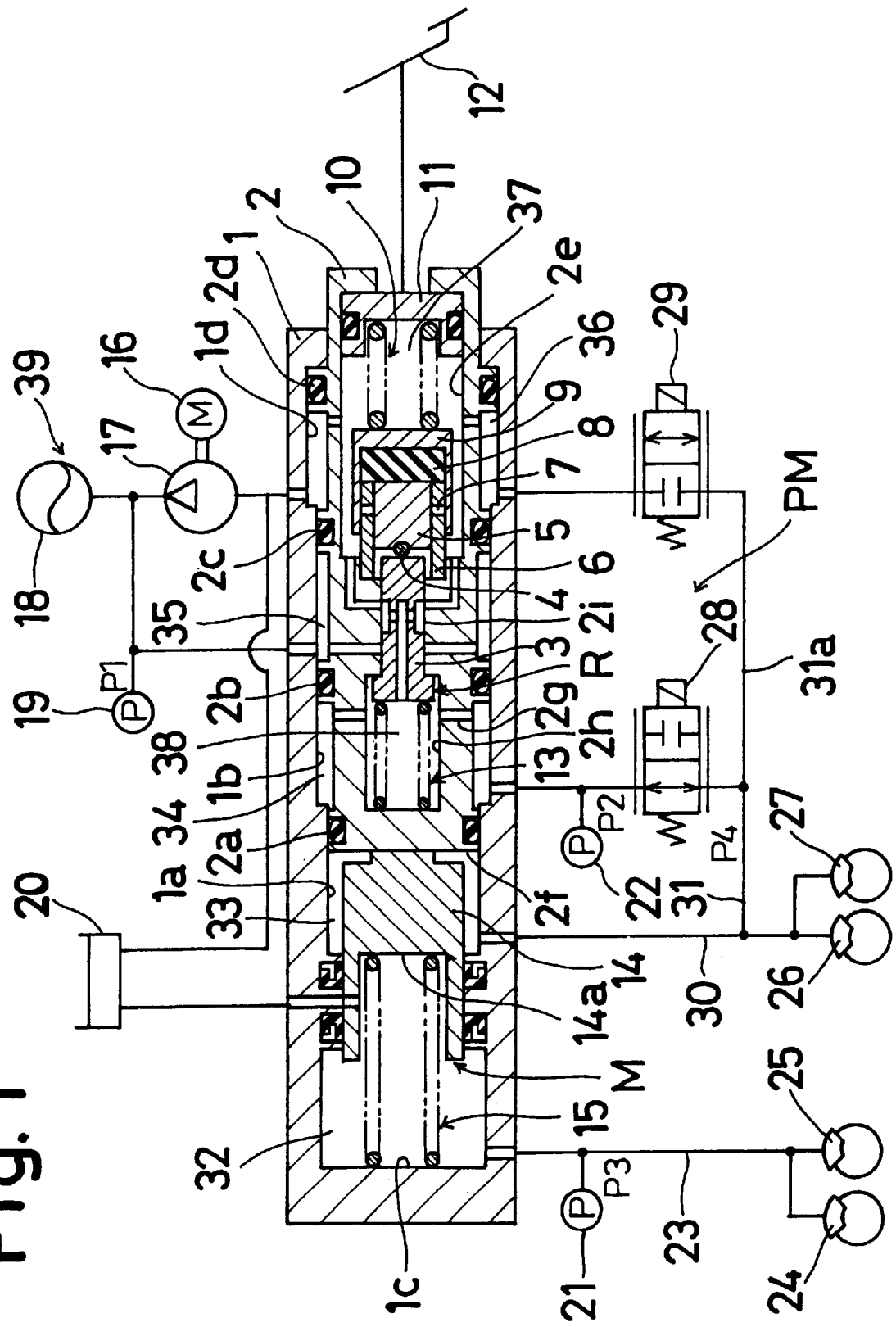
FIG. 1 is a schematic illustration of a hydraulic brake apparatus for a vehicle according to one embodiment of the present invention.

FIG. 1 illustrates a hydraulic brake apparatus 10 for an electric vehicle according to one embodiment. Since the structure related to the regenerative braking is well known, it is omitted from FIG. 1.

As shown in FIG. 1, a master cylinder piston (hereinafter named as M/C piston) 14 and an auxiliary piston 2 are slidably disposed in a cylinder 1 which has a bottom portion 1c in one end. The M/C cylinder piston 14 is located at the position closer to the bottom portion 1 of the cylinder 1 than auxiliary piston 2. A master cylinder pressure chamber (hereinafter named as M/C pressure chamber) 32 is defined between the bottom portion 1c of the cylinder 1 and the front face of the M/C piston 14. The M/C pressure chamber 32 generates the master cylinder pressure (hereinafter named as M/C pressure) P3 therein by forward movement of the M/C piston 14. The M/C pressure chambers 32 is connected to wheel cylinders 24, 25 via a hydraulic pressure passage 23 and the wheel cylinders 24, 25 are operated by the master cylinder pressure P3 and apply braking force corresponding to the pressure P3 to respective wheels (not shown). An auxiliary pressure chamber 33 is defined between the rear face of the M/C piston 14 and the front face 2f of the auxiliary piston 2. An auxiliary pressure chamber 33 is connected to wheel cylinders 26, 27 via a hydraulic pressure passage 30 to supply the auxiliary pressure P4 generated in the auxiliary pressure chamber 33 to wheel cylinders 26, 27. The wheel cylinders 26, 27 apply braking force corresponding to the pressure P4 to respective wheels (not shown).

The cylinder 1 has a small diameter bore 1a, a large diameter bore 1b and the largest bore 1c which are located in order from the side of the bottom portion 1c. The diameter of the large diameter bore 1b is larger than that of the small diameter bore 1a and the diameter of the largest diameter bore 1c is larger than that of the large diameter bore 1b. The auxiliary piston 2 is shaped as step and has a small diameter piston portion 2a, two large diameter piston portions 2b, 2c and the largest piston portion 2d which are located coaxially. The diameter of each large diameter piston portions 2b, 2c is larger than that of small diameter piston portion 2a and the diameter of the largest diameter piston portion 2d is larger than that of each large diameter bore 2b, 2c. The small diameter piston portion 2a, two large diameter piston portions 2b, 2c and the largest piston portion 2d are sealed slidably on the small diameter bore 1a, the large diameter bore 1b and the largest bore 1c, respectively.

A high-pressure chamber 35 is defined by the large diameter bore 1b, the large diameter piston portions 2b, 2c and a predetermined power pressure P1 of a hydraulic pressure generator 39 is supplied to the high-pressure chamber 35. A low-pressure chamber 36 is defined by the large diameter bore 1b, the largest diameter bore 1c and the largest piston portion 2d. The low-pressure chamber 36 always communicates with a reservoir 20 and thus a pressure in the low-pressure chamber 36 is always an atmosphere.

A pressure chamber 34 is defined by the small diameter bore 1a, the large diameter portion 1b, the small diameter piston portion 2a and the large diameter piston portion 2b. If a pressure P is generated in the pressure chamber 34, a biasing force is applied to the auxiliary piston 2 to bias the piston 2 backward. If an area of a circle with the outer diameter of the large diameter piston portion 2b is A, an area of a circle with the small diameter of the small diameter piston portion 2a is B, the predetermined pressure in the output chamber is P The biasing force is represented as P×(A−B).

The hydraulic pressure generator 39 serving as a power pressure source for generating a predetermined power pressure P1 irrespective of operation of a brake pedal 12 and outputting the power pressure P1. The hydraulic pressure generator 12 includes an accumulator 18, a pressure sensor 19, a DC electric motor 16 and a hydraulic pump 17. The accumulator 18 accumulates the hydraulic fluid in the pressurized condition and the pressure sensor 19 detects the pressure P1 accumulated in the accumulator 18 to output to an electronic controller (not shown). The motor 16 is driven and controlled by the controller in response to an output of the pressure sensor 19 to drive the pump 17. The pump 17 sucks and pressurizes a hydraulic fluid from a reservoir 20 to supply the pressurized hydraulic fluid to the accumulator 18. The motor 16 is controlled so that the pressure P1 in the accumulator 18 is maintained between a lower limit value and an upper limit value.

A rear inner bore 2e, a front inner bore 2h and a penetrating bore 2i are formed in the auxiliary piston 2. These bores 2e, 2h, 2i are located coaxially and the penetrating bore 2i connects the rear inner bore 2e to the front inner bore 2h. A spool 3 with a flange is slidably disposed in the penetrating bore 2i and the spool 3 is biased backward by a spring 13 disposed in the front inner bore 2h. As a result, when the brake pedal 12 is not operated, the flange of the spool 3 is contacted to the rear end face of the front inner bore 2h and is kept at the initial position shown in FIG. 1.

A output chamber 38 is defined by the spool 3 and the front inner bore 2h of the auxiliary piston 2 and the output chamber 38 communicates with the pressure chamber 34 via a communicating passage formed in the auxiliary piston 2 to supply the pressure generated in the output chamber 38 to the pressure chamber 34.

A columnar member 5 contacts to the rear end of the spool 3 through a steel ball 4. The columnar member 5 is slidably disposed in a cylindrical member 6 fixed to the front side of the rear inner bore 2e of the auxiliary piston 2 and a cup-shaped member 9 is slidably disposed on the outer circular face of the cylindrical member 6. The cup-shaped member 9 is biased forward by a spring 10. The spring 10 is disposed between the rear end of the cup-shaped member 9 and an input member 11 slidably disposed in the rear side of the rear inner bore 2e. The input member 11 is connected to the brake pedal 12 and the initial position of the brake pedal 12 is set to the position in which the rear end of the input member 11 contacts to the rear end of the rear inner bore 2e by the biasing force of the spring 10. The spring 10 functions as a stroke simulator for permiting the input member 15 to move by a stroke corresponding to the braking operation force applied to the brake pedal 12. The preset load of the spring 10 is smaller than that of the spring 13.

A columnar rubber disk 8 (disk-shaped elastic member) is disposed in the bottom portion of the cup-shaped member 9 and receives a forward force from the bottom of the cup-shaped member 9 and a backward force from the rear end face of the columnar member 5 during non-operation of the brake pedal shown in FIG. 1. When the rubber disk 8 is moved forward relative to the auxiliary piston 2 by more than a predetermined distance, an outside front end portion of the rubber disk 8 which does not contact to the columnar member 5 contacts to the rear end face of the cylindrical member 5 via a resin ring 7. As a result, the rubber disk 8 also receives a backward force from the rear end face of the cylindrical member 6 or the auxiliary piston 2. Thus, the rubber disk 8 distributes the braking operation force generated by the operation of the brake pedal 12 to the auxiliary piston 2 and the spool 3. A low-pressure chamber 37 is defined by the rear inner bore 2e, the input member 11 and the spool 3 and the chamber 37 communicates with the low-pressure chamber 36.

As apparent from the above structure, the spool 3 is biased forward by the force distributed to the rear end of the columnar member 5 through the rubber disk 8 while the spool 3 is biased rearward by the biasing force of the spring 13 and the pressure in the output chamber 38. These force relations slidably move the spool 3 relative to the auxiliary piston 2.

When the spool 3 is located in the initial position shown in FIG. 1 (during non-operation of the brake pedal 12), the output chamber 38 is communicated with the low-pressure chamber 37 and the reservoir 20 by a circular groove and a plural of passages formed in the spool 3. If the spool 3 is moved forward relative to the auxiliary piston 2 by a certain distance from the initial position, the output chamber 38 is communicated with the high-pressure chamber 35 and the accumulator 18 by the circular groove and the passages. Thus, the pressure P2 in the output chamber 38 is regulated by the relative movement of the spool 3 to the auxiliary piston 2 and the pressure P2 is regulated to a pressure corresponding to the brake operation force. The spool 3 and the spring 13, etc constitute a regulation valve R.

The pressure P2 in the output chamber 38 is supplied to the pressure chamber 34 via the communicating passage 2g and the pressure P2 is supplied to a pressure modulation device PM. The pressure modulation device PM decreases the pressure P2 in the output chamber 38 and then supplies the decreased pressure P4 to the auxiliary pressure chamber 33 through passages 31, 30. The detailed structure of the pressure modulation device PM is explained later. The pressure P4 in the auxiliary pressure chamber 33 is applied to the front end face 2f of the auxiliary piston 2 and thus the auxiliary piston 2 is kept in an initial position by the biasing force representing as B×P4. B is an area of the front-end face 2f, i.e. the area of a circle whose diameter is an outer diameter of the small-diameter piston portion 2a. The initial position of the auxiliary piston 2 is determined by an engagement between the rear end face of the largest-diameter piston portion 2d and the rear end portion of the cylinder 1. Further, since the pressure P4 in the auxiliary pressure chamber 33 is applied to the rear end face of the M/C piston 14, the M/C piston 14 is moved forward and thus the M/C pressure P3 is generated in the M/C pressure chamber 32.

The M/C piston 14 is biased rearward by a spring 15 disposed between a bottom 1c of the cylinder 1 and a bottom of a concave portion 14a formed at the front end of the M/C piston 14. During the non-operation of the brake pedal 12 shown in FIG. 1, the M/C piston 14 is kept in an initial position by the engagement between the rear end face thereof and the front end face 2f of the auxiliary piston 2. In this condition, the M/C pressure chamber 32 communicates with the reservoir 20 and thus the M/C pressure P3 is equal to the atmospheric pressure. The pressure receiving area of the M/C piston 2 from the M/C pressure chamber 32 is equal to the pressure receiving area thereof from the auxiliary pressure chamber 33. The M/C pressure P3 is a pressure subtracting a pressure corresponding to the biasing force of the spring 15 from the pressure P4 in the auxiliary pressure chamber 33.

The pressure modulation device PM includes a normally-open proportioning solenoid valve 28 and a normally closed proportioning solenoid valve 29. The proportioning solenoid valve 28 is disposed in a hydraulic pressure passage 31 connecting the output chamber 38 to the auxiliary pressure chamber 33. The proportioning solenoid valve 29 is disposed in a diverging pressure passage 32 connecting the hydraulic pressure passage 31 to the low-pressure chamber 36. A pressure sensor 22 is connected to the pressure passage 31 between the proportioning solenoid valve 28 and the output chamber 38 to sense the output pressure P2 in the output chamber 38. A pressure sensor 21 is connected to the pressure passage 23 to sense the M/C pressure P3. The outputs of these pressure sensors 21, 22 are inputted to the controller. The controller controls the proportioning solenoid valves 28, 29 based on the outputs of the pressure sensors 21, 22 such that the pressure P2 outputted from the output chamber 38 is decreased by a pressure corresponding to an appropriate regenerative braking force to be generated and the decreased pressure P4 is supplied to the auxiliary pressure chamber 33.

Hereinafter, the operation of the hydraulic braking apparatus in this embodiment is explained.

In case both the hydraulic pressure generator 39 and the regulation valve R are a normal condition in which the pressure corresponding to the braking operation force is outputted to the output chamber 38, the operation is explained at first. If the brake pedal 12 is operated (depressed) in FIG. 1, the braking operation force is distributed into the spool 3 and the auxiliary piston 2 by the rubber disk 8 and thus the spool 3 is moved forward relative to the auxiliary piston 2 by the certain distance against the biasing force of the spring 13. As a result, the output chamber 38 is communicated with the high-pressure chamber 35 and then the pressure P2 is generated in the output chamber 38. Until this condition, the auxiliary piston 2 is kept in the initial position shown in FIG. 1 by the biasing force of the spring 15.

After the pressure P2 is generated in the output chamber 38, the spool 3 is slidably moved by the relation between the forward biasing force distributed from the braking operation force and the rearward biasing force by the spring 13 and the pressure P2. As a result, the pressure P2 in the output chamber 38 is regulated to the pressure corresponding to the braking operation force. The pressure P2 is supplied to the pressure chamber 34 via the communicating passage 2g and thus the auxiliary piston 2 is biased rearward. As explained above, the rearward biasing force is represented as P2×(A−B). A is the area of the circle with the outer diameter of the large diameter piston portion 2b and B is the area of the circle with the small diameter of the small diameter piston portion 2a.

The pressure P2 is supplied to the pressure modulation device PM. The controller calculates the appropriate regenerative braking force to be generated at present based on the information various sensors (not shown) obtained from members (not shown) related to the regenerative braking, and then calculates the pressure corresponding to the calculated regenerative braking force. Since such calculation is well known, the detailed explanation is omitted. Further, the controller controls the proportioning solenoid valves 28, 29 such that the pressure difference between the pressure P2 in the output chamber 38 sensed by the pressure sensor 22 and the M/C pressure P3 sensed by the pressure sensor 21 corresponds to the pressure corresponding to the regenerative braking force.

The decreased pressure P4 is supplied to the auxiliary pressure chamber 33 and the wheel cylinders 26, 27. As a result, a hydraulic braking force based on the pressure P4 subtracting the pressure corresponding to the regenerative braking force from the pressure P2 in the output chamber corresponding to the braking operation force, is applied to the correspond wheels. Further, the M/C piston 14 is moved forward by the pressure P4 in the auxiliary pressure chamber 34 and then the M/C pressure P3 is generated in the M/C pressure chamber 32. The M/C pressure P3 is supplied to the wheel cylinders 24, 25. As a result, a hydraulic braking force based on the pressure P3 subtracting the pressure corresponding to the regenerative braking force from the pressure P2 in the output chamber corresponding to the braking operation force, is applied to the correspond wheels.

While the hydraulic braking force is applied to the four wheels, the regenerative braking force is applied to two driving wheels (e.g. the wheels corresponding to the wheel cylinders 24, 25) driven by a motor (not shown). Therefore, the total braking force applied to the vehicle becomes the braking force corresponding to the braking operation force required by the driver.

During the operation of the brake pedal 12, the auxiliary piston 2 receives not only the rearward biasing force calculated by the formula P4×B but also the rearward biasing force calculated by the formula P2×(A−B). By these rearward biasing forces, the auxiliary piston 2 is kept (fixed) in the initial position shown in FIG. 1.

In case at least one of the hydraulic pressure generator 39 and the regulation valve R is an abnormal condition in which the pressure P2 can not be outputted to the output chamber 38, the operation is explained. The rubber disk 8 transmits all of the braking operation force to the auxiliary piston 2 because the rubber disk 8 does not receive the rearward biasing force from the spool 3. As a result, the auxiliary piston 2 is moved forward by the braking operation force and thus the M/C piston 14 is moved forward together with the auxiliary piston 2 such that the rear end face thereof continues to contact to the front-end face 2f of the auxiliary piston 2. The M/C pressure P3 is generated in the M/C pressure chamber 32 and then is supplied to the wheel cylinders 24, 25. Therefore, even if at least one of the hydraulic pressure generator 39 and the regulation valve R is the abnormal condition, the hydraulic braking force can be applied the wheels corresponding to the wheel cylinders 24, 25.

Hereinafter, the effect (advantage) of this embodiment is explained.

In case the hydraulic pressure generator 39 and the regulation valve R is the normal condition in which the pressure P2 corresponding to the braking operation force is outputted to the output chamber 38, the auxiliary piston 2 is biased rearward by not only the pressure P4 in the auxiliary pressure chamber 33 but also the pressure P2 in the pressure chamber 34 communicating with the output chamber 38.

If it is necessary to generate relative large regenerative braking force in dependence on the vehicle condition, the pressure P4 supplied to the auxiliary pressure chamber 33 becomes relative low and thus the rearward biasing force by the pressure P4 for biasing the auxiliary piston 2 is relative small. Even this case, the auxiliary piston 2 is always biased by the pressure P2 in the pressure chamber 34. Thus, the auxiliary piston 2 is restrained from moving forward unnecessarily.

In addition, since the rubber disk 8 is provided for distributing the braking operation force to the auxiliary piston 2 and the spool 3, the relation between the braking operation force and the braking hydraulic pressure can be changed by only changing the contacting area between the rubber disk 8 and the columnar member 5. The hydraulic brake apparatus can be freely designed to apply to various vehicle models.

Further, the pressure chamber 33 is defined by the small and large diameter portions 1a, 1b of the cylinder 1 and the small and large diameter piston portions 2a, 2b of the auxiliary piston 2. As a result, the pressure chamber 33 can be constituted by a simple structure such that the pressure therein biases the auxiliary piston 2 rearward.

If the relation formula "F<P2×(A−B)" is established (F: braking operation force, P2: the pressure in the output chamber 38, A: the area of the circle with the outer diameter of the large diameter piston portion and B: the area of the circle with the small diameter of the small diameter piston), the auxiliary piston 2 can be prevented from moving forward during the regenerative cooperation brake.

In detail, in case the hydraulic pressure generator 39 and the regulation valve R is the normal condition, the rearward biasing force applied to the auxiliary piston 2 is the total of P4×B and P2×(A−B). On the other hand, the forward biasing force applied to the auxiliary piston 2 is F. From these relation, the resulting rearward biasing force is P4×B+P2×(A−B)−F. Even if it is assumed that the pressure P4 in the auxiliary chamber 33 is zero, i.e. the auxiliary piston 2 is moved forward easiest, the auxiliary piston 2 does not move forward by the above relation P2×(A−B)>F.

FIG. 2 illustrates a hydraulic brake apparatus for an electric vehicle according to another embodiment. In FIG. 2 the members whose structures are the same as that of the members shown in FIG. 1 are marked in the same way as FIG. 1.

The hydraulic brake apparatus is different from the hydraulic brake apparatus of one embodiment in the following structures: A normally closed proportioning solenoid valve 40 is further disposed in a pressure passage 41 connecting the diverging pressure passage 31*a* to the accumulator 18. The normally-open proportioning solenoid valve 28 in one embodiment is changed into a normally-open 2-position switching solenoid valve 28*a* which are positioned in an opening position of the pressure passage 31 and in a closed position thereof. In this embodiment, during the regenerative cooperation brake, the controller operates the switching solenoid valve 28*a* in the closed position and controls the proportioning solenoid valves 40 and 29 such that the pressure P4 decreasing the pressure corresponding to the regenerative braking force from the pressure P2 in the output chamber 38, is supplied to the auxiliary pressure chamber 33. Thus, the pressure P4 in the auxiliary pressure chamber 33 is supplied to the wheel cylinders 26, 27 and the M/C pressure P3 is supplied to the wheel cylinders 24, 25.

In this embodiment, also when the brake pedal 12 is not operated, the controller operates the switching solenoid valve 28*a* in the closed position and controls the proportioning solenoid valves 40 and 29 and thus a desired hydraulic pressure can be supplied to not only the wheel cylinders 26 and 27 but also the wheel cylinders 24 and 25. Therefore, an automatic braking control such as adaptive cruise control, lateral skid restraining control, traction control can be performed.

In the embodiments shown in FIGS. 1 and 2, the rubber disk 8, the cylindrical member 6 and the resin ring 7 may be omitted such that all of the braking operation force is applied to the columnar member 5 and the spool 3. According to this structure, the hydraulic brake apparatus is cheaper.

The principles, preferred embodiments and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A hydraulic brake apparatus for a vehicle comprising:
    a hydraulic pressure generator which generates a power pressure irrespective of operation of a brake pedal and outputs the power pressure;
    a regulation valve which regulates the power pressure outputted from the hydraulic pressure generator to a predetermined pressure corresponding to an operation force of the brake pedal and outputs the predetermined pressure to an output chamber;
    a master cylinder including a master cylinder piston and a master cylinder pressure chamber which is located forward the master cylinder piston to generate a master cylinder pressure by forward movement of the master cylinder piston;
    a wheel brake cylinder connected to the master cylinder chamber and operated by the master cylinder pressure to apply braking force to a wheel of the vehicle;
    an auxiliary piston located backward the master cylinder piston to define an auxiliary pressure chamber between the master cylinder piston and the auxiliary piston and to move the master cylinder piston forward by an auxiliary pressure in the auxiliary pressure chamber;
    a pressure modulating device which modulates the auxiliary pressure in the auxiliary pressure chamber to a pressure less than the predetermined pressure in the output chamber of the regulation valve; and
    a pressure chamber which communicates with the output chamber of the regulation valve to bias the auxiliary piston backward by a pressure in the pressure chamber; wherein
    the auxiliary piston is biased backward by both the auxiliary pressure in the auxiliary pressure chamber and the pressure in the pressure chamber when both of the hydraulic pressure generator and the regulation valve are a normal condition in which the predetermined pressure can be outputted to the output chamber of the regulation valve, and the auxiliary piston is moved forward by the operation force of the brake pedal to move the master cylinder piston forward when at least one of the hydraulic pressure generator and the regulation valve is an abnormal condition in which the predetermined pressure cannot be outputted to the output chamber of the regulation valve.

2. A hydraulic brake apparatus for a vehicle according to claim 1, further comprising:
    a cylinder which accommodates the auxiliary piston and includes a small diameter portion and a large diameter portion which is located backward the small diameter portion and has a diameter larger than that of the small diameter portion, wherein
    the auxiliary piston has a small diameter piston portion sealed slidably in the small portion of the cylinder and a large diameter piston portion sealed slidably in the large portion of the cylinder,
    the pressure chamber is defined by the small and large diameter portions of the cylinder and the small and large diameter piston portions of the auxiliary piston.

3. A hydraulic brake apparatus for a vehicle according to claim 2, wherein if an area of a circle whose diameter is the outer diameter of the large diameter piston portion is A, an area of a circle whose diameter is the small diameter of the small diameter piston portion is B, the predetermined pressure in the output chamber is P and the operation force of the brake pedal is F, a relation "F<P×(A−B)" is established.

4. A hydraulic brake apparatus for a vehicle according to claim 1, wherein the pressure modulating device decreases the predetermined pressure outputted from the output chamber of the regulation valve to supply the auxiliary pressure to the auxiliary pressure chamber.

5. A hydraulic brake apparatus for a vehicle according to claim 4, wherein the pressure modulating device includes a pressure-increase control valve and a pressure-decrease control valve, the pressure-increase control valve is disposed in a pressure passage connecting the output chamber of the regulation valve to the auxiliary pressure chamber and the pressure-decrease control valve is disposed in a pressure passage connecting the auxiliary pressure chamber to a reservoir.

6. A hydraulic brake apparatus for a vehicle according to claim 5, wherein the pressure-increase control valve and/or the pressure-decrease control valve is a proportioning solenoid valve.

7. A hydraulic brake apparatus for a vehicle according to claim 1, further comprising a second wheel cylinder connected to the auxiliary pressure chamber.

8. A hydraulic brake apparatus for a vehicle according to claim 1, wherein the pressure modulating device decreases the power pressure outputted from the hydraulic pressure generator to supply the auxiliary pressure to the auxiliary pressure chamber.

9. A hydraulic brake apparatus for a vehicle according to claim 8, wherein the pressure modulating device includes a first valve a second valve and a third valve, the first valve is disposed in a first pressure passage connecting the output chamber of the regulation valve to the auxiliary pressure chamber to open/close the first pressure passage, the second valve is disposed in a second pressure passage connecting the output side of the hydraulic pressure generator to the auxiliary pressure chamber to the first pressure passage between the first valve and the auxiliary pressure chamber to increase the auxiliary pressure in the auxiliary pressure chamber, and the third valve is disposed in a third pressure passage connecting the auxiliary pressure chamber to a reservoir to decrease the auxiliary pressure in the auxiliary pressure chamber.

10. A hydraulic brake apparatus for a vehicle according to claim 9, wherein the first valve is a two-position switching solenoid valve and the second and third valves are proportioning solenoid valves.

* * * * *